US006544691B1

(12) United States Patent
Guidotti

(10) Patent No.: US 6,544,691 B1
(45) Date of Patent: Apr. 8, 2003

(54) BATTERIES USING MOLTEN SALT ELECTROLYTE

(75) Inventor: Ronald A. Guidotti, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 123 days.

(21) Appl. No.: 09/689,238

(22) Filed: Oct. 11, 2000

(51) Int. Cl.$^7$ ................................................ H01M 6/04
(52) U.S. Cl. .................. 429/344; 429/307; 429/321; 429/338
(58) Field of Search ................. 429/338, 321, 429/307, 344

(56) References Cited

U.S. PATENT DOCUMENTS

| | | | |
|---|---|---|---|
| 4,416,000 A | | 11/1983 | Scherbatskoy |
| 4,463,072 A | | 7/1984 | Gifford et al. |
| 4,731,307 A | | 3/1988 | Guidotti |
| 5,238,761 A | * | 8/1993 | Ryan ........................... 429/199 |
| H1544 H | * | 6/1996 | Miles .......................... 429/108 |
| 5,552,238 A | | 9/1996 | Carlin et al. |
| 5,895,730 A | | 4/1999 | Ritchie |
| 5,965,054 A | * | 10/1999 | McEwen et al. .......... 252/182.1 |

OTHER PUBLICATIONS

Giwa, "Feasibility Study of Materials for a Medium–Temperature Reserve Cell Concept," Materials Science Forum, vol. 73–72, (1991), pp. 669–706.
McManis, Miles, Fletcher, "High Power Density Thermal Battery Technology Using Oxidizing Molten Salts," Proceedings of the 30$^{th}$ Power Sources Symposium, (Jun. 7–10, 1982), pp. 39–42.
Trachant, Messina, Perichon, "Electrochemical Behaviour of CuO+V$_2$O$_5$ Systems in Molten Dimethyl Sulfone at 150° C.," J. Electroanal. Chem, 242 (1988), pp. 181–190.
Faucheur, Messina, Perichon, "A Study of the Electrochemical Intercalation of Lithium in V$_2$O$_5$ in Molten Dimethylsulfone at 130° C.," J, Electrochem Soc.: Electrochemical Science and Technology, V. 135 (4), (1988), pp. 1871–1874.
Bach, Pereira–Ramos, Baffier, Messina, "Electrochemical Behaviour of Some Manganese Dioxides as Rechargeable Li Intercalation Materials in Molten Diemthylsulfone at 150° C.," 6$^{th}$ International Meeting on Lithium Batteries, Munster, Germany, (1992), pp. 338–340.
Giwa, "Feasibility Study of Sulphone–Based Electrolytes for a Medium–Temperature Reserve Cell Concept," Journal of Power Sources, 42, (1993), pp. 389–397.
Giwa, "Feasibility Study of Sulphone–Based Electrolytes for a Medium–Temperature Reserve Cell Concept," 1992 IEEE 35$^{th}$ International Power Sources Symposium, (1992), pp. 215–218.
Carlin, Fuller, Kuhn, Lysaght, Trulove, "Electrochemistry of Room–Temperature Chloroaluminate Molten Salts at Graphitic and Nongraphitic Electrodes," Journal of Applied Electrochemistry, 26, (1996), pp. 1147–1160.

(List continued on next page.)

Primary Examiner—Carol Chaney
Assistant Examiner—Dah-Wei D. Yuan
(74) Attorney, Agent, or Firm—Elmer A. Klavetter

(57) ABSTRACT

An electrolyte system suitable for a molten salt electrolyte battery is described where the electrolyte system is a molten nitrate compound, an organic compound containing dissolved lithium salts, or a 1-ethyl-3-methlyimidazolium salt with a melting temperature between approximately room temperature and approximately 250° C. With a compatible anode and cathode, the electrolyte system is utilized in a battery as a power source suitable for oil/gas borehole applications and in heat sensors.

9 Claims, 4 Drawing Sheets

OTHER PUBLICATIONS

Caja, Dunstan, Ryan, Katovic, "Application of Ionic Liquids as Electrolytes in Lithium Rechargeable Cells," Electrochemical Society Proceedings, V. 99–41, pp. 150–159.

Cooper, O'Sullivan, "New Stable, Ambient–Temperature Molten Salts," pp. 386–396.

Guidotti, Reinhardt, "Characterization of Low–Melting Electrolytes for Potential Geothermal Borehole Power Supplies: The LiBr–KBr–LiF Eutectic," $193^{rd}$ Meeting of the Electrochemical Society, (1998) pp. 1–9.

Guidotti, Reinhardt, "Characterization of the LiSi/CsBr–LiBr–KBr/$FeS_2$ System for Potential Use as a Geothermal Battery Source," $196^{th}$ Meeting of the Electrochemical Society, (1999) pp. 1–13.

Guidotti, Reinhardt, "Performance of Li–Alloy/$Ag_2CrO_4$ Couples in Molten CsBr–LiBr–KBr Eutectic," 196th Meeting of the Electrochemical Society, (1999) pp. 1–11.

Guidotti, Reinhardt, "Characterization of High–Voltage Cathodes in CsBr–LiBr–KBr Eutectic Electrolyte," $39^{th}$ Power Source Conference, (2000) pp. 1–4.

Guidotti, Reinhardt, "The Performance of Manganese Oxides as a Function of Temperature in Several Molten–Salt Systems," IBA 2000 Manganese Oxide Battery Symposium at Argonne National Lab, (2000) pp. 1–9.

\* cited by examiner

BATTERIES USING MOLTEN SALT ELECTROLYTE

This invention was made with Government support under Contract No. DE-AC04-94AL85000 awarded by the United States Department of Energy. The Government has certain rights in the invention.

BACKGROUND OF THE INVENTION

The present application relates to batteries and more particularly relates to molten salt electrolyte systems that have melting temperatures from approximately room temperature to 250° C. and higher.

There are generally two main types of high temperature electrical batteries that use molten salt electrolytes: thermal batteries and high temperature rechargeable batteries. The thermal batteries are primary (non-rechargeable) batteries and normally generate a single continuous energy output on activation. The duration of the output may vary from a few seconds to over two hours dependent on battery design and construction. Such batteries are particularly suited to short burst high power applications. The high temperature rechargeable batteries are of interest as power supplies for submarines and electric vehicles. Both primary reserve thermal batteries and high temperature rechargeable batteries use an electrolyte that is an ionically-conducting liquid in the high temperature operational state but a non-conducting solid in the storage state.

Thermal batteries are formed from a series construction of cells having an inert state and a thermally active state. The normal storage state is the inert state when the cell electrolyte between the anode and cathode is in a solid form, generally at ambient temperature. The thermally active state exists when the electrolyte is molten and this state may be obtained rapidly when required by igniting a charge of a pyrotechnic material in close proximity to the electrolyte. The cell temperature in the thermally active state is typically 350–600° C.

In known modern thermal batteries, the anode is usually based on lithium. This may be in the form of a solid electrode of a lithium alloy (with boron, silicon or aluminum) held in a support or as liquid lithium or lithium based mixtures retained in a foraminous metal substrate by capillary action. Almost all modern thermal batteries use lithium or its alloys in the anode because of its high electrode potential, its high coulombic capacity due to its low atomic weight and its relatively high chemical stability which facilitates handling. The cathode is a disc of iron sulfide or disulfide containing electrolyte or separator materials (electrolyte-binder), and lithium oxide to suppress voltage transients on activation.

The separator which provides ionic conductivity during discharge is generally in the form of a pressed powder pellet commonly comprising a binder and a eutectic mixture of lithium chloride and potassium chloride or of lithium fluoride, lithium chloride and lithium bromide, although other mixtures are known. The electrolyte is generally incorporated into an inert binder such as magnesium oxide, zirconia, or aluminum nitride, which immobilize it when molten by capillary action. The advantages of molten salts as battery electrolytes are that they have high conductivity for high currents and power densities, thermal stability, chemical stability towards anodes and cathodes, cheapness and ready availability. However, they also have the disadvantage of having high melting points which necessitate high operating temperatures, high heat input to activate the batteries and may cause thermal management problems.

The thermal input required can be obtained rapidly by ignition of pyrotechnic material, which can be a mixture of iron and potassium perchlorate in the form of a pellet contained in each cell. The cells can be connected in a stack, each cell being separated by a pellet of pyrotechnic material. The stack is typically hermetically sealed within a stainless steel case. The high power density and long maintenance free storage life (>50 years) make thermal batteries well suited to certain military applications.

The term molten salt electrolyte as used in the context of such batteries generally refers to a lithium halide containing salt that is maintained at a temperature above its melting point. The molten salt is commonly either a mixture of lithium halides, or a mixture of one or more lithium halides in combination with other alkali metal or alkaline earth halides. In the latter case, binary eutectic mixtures of lithium halide salts with halide salts of potassium, or occasionally barium and strontium, are preferred. Two principal molten electrolytes that have become established for high temperature batteries are binary lithium chloride-potassium chloride eutectic mixtures of melting point around 352° C. and ternary lithium fluoride-lithium chloride-lithium bromide eutectic mixtures of melting point around 445° C.

When power sources are required for lower-temperature applications, such as in geothermal technology applications, lithium/thionyl chloride cells can be used but they are limited to operating temperatures of 180° C. to 200° C. Operation at higher temperatures can caused explosive or venting events, presenting hazards to personnel and adjacent electronics.

Mixtures of salts of lithium and other metals have the advantage of lower melting points than mixtures of lithium halides only, but high currents cannot be passed at temperatures only slightly above the melting point due to resultant lithium concentration changes raising the melting point. The above is particularly marked in the case of the preferred binary eutectics. The effective minimum operating temperature is therefore appreciably above the melting point of the eutectic. This problem does not arise with electrolytes comprising mixtures of lithium halides only, which offer higher conductivities at or near the melting point, but these already exhibit higher melting points and thus also require relatively high heat input to operate the batteries. The so-called all-lithium mixture also exhibits a high rate of self discharge when batteries using them are placed on open circuit.

DETAILED DESCRIPTION OF THE INVENTION

Figure 1:
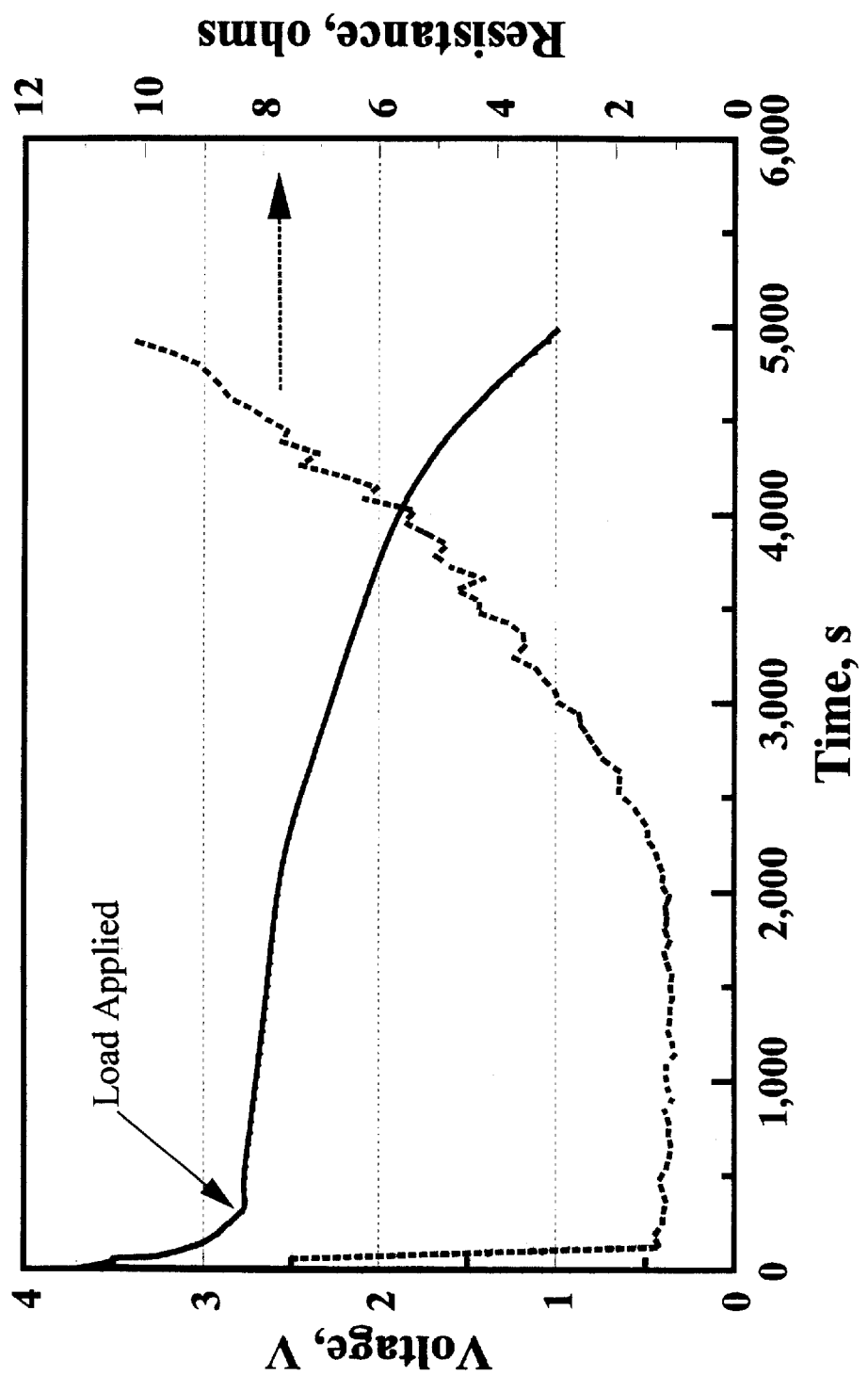
FIG. 1 shows cell electrochemical characteristics for the 44% Li/56% Si/LiNO$_3$—KNO$_3$/CrO$_2$ system.

The present invention is an molten salt electrolyte system for a molten salt electrolyte battery suitable for environments requiring a power source at temperatures from ambient temperature to approximately 250° C. and higher. The molten salt electrolyte system can utilize molten nitrate compounds, organic compounds containing at least one dissolved lithium salt and room-temperature molten salts, all having melting temperatures between ambient temperature and approximately 250° C. A battery using this electrolyte system comprises the electrolyte system of the present invention with an anode and cathode that are compatible with the electrolyte system. In particular, only combinations of electrolyte and anode and cathodes can be used in which no significant exothermic reactions occur at the operation temperature of interest.

These batteries have applications in boreholes, such as those used for oil/gas borehole logging and environmental monitoring, and in sensors that monitor situations where excessive heat can be deleterious, such as in heat sensors that monitor the on-set of fires or the on-set of melting components, such as bearings. In borehole applications, the batteries (power sources) should be capable of operation at temperatures above 200° C. and preferably up to approximately 250° C. or higher. In the case of power supplies for oil/gas borehole logging (measurement while drilling, or MWD), temperatures can be as high as 250° C., which is above the melting point of pure Li metal, commonly used as an anode for a number of technologies. The electrolyte system must have a melting temperature below the operating temperature required in the borehole (e.g., 250° C.) and, in combination with the electrodes, must not cause significant exothermic reactions at temperatures below the operating temperature.

The current batteries for oil/gas borehole logging applications are based on $SOCl_2$ (thionyl chloride) coupled with an alloy of Li with Mg, to raise the melting point of the anode. This material has rate limitations, however, and does not always work as expected in the field. There have been cases of these batteries venting violently while in use. Consequently, there are safety concerns for personnel that are using them. The electrolyte system of the present invention is stable at the these operating temperatures and can also provide a greater rate capability, in terms of current density over the Li(Mg)/$SOCl_2$ battery cells.

If the melting point of the ionically conducting electrolyte is greater than the desired operating temperature, such as could occur at the top of a borehole, then a resistance heater or pyrotechnic can be incorporated into the battery to preheat it on the surface prior to insertion into the borehole. Once the battery reaches the hot zone of the borehole, the ambient temperature will be high enough to maintain the electrolyte in the battery molten and thus allowing it to continue to provide power. An important advantage of the system of the present invention is that expensive insulating dewars and the like do not have to be utilized to protect the electronics and battery while during MWD activities.

One category of molten salt electrolytes suitable for borehole use and other applications requiring a power source operating at temperatures up to approximately 250° C. is molten nitrates. The $LiNO_3$—$KNO_3$ eutectic, for example, melts at 125° C. Addition of $CsNO_3$ to this system to form a ternary eutectic lowers the melting point to 95° C. Mixtures that incorporate nitrites are also suitable. For example, the $KNO_3$—$LiNO_2$ eutectic melts at 102° C. and the $KNO_2$—$LiNO_3$ eutectic melts at 108° C. $NaNO_2$ can be used with $LiNO_3$ to form a eutectic that melts at 124° C. Ternary nitrates that use $NaNO_3$ are equally usable.

Anodes that are suitable for use in this system include Li(Al) alloys (typically with approximately 20%–25% Li by weight), Li(Si) alloys (typically with approximately 40%–55% Li), Ca, Mg, Zn and Li(B) alloys, which comprise elemental Li held in a Li—B intermetallic matrix. Molten Li can also be used if it is properly immobilized, such as with Ni, Cu, or stainless steel Feltmetal (porous metallic plaques or mats). Alternatively, it can be bound with up to 80% high-surface-area Fe powder, which will hold the liquid Li in place by capillary action. These anodes are stable when in direct physical contact with the highly oxidizing melts only because of the formation of a passive protective oxide film that limits chemical reaction (self discharge).

The temperature interval over which the anodes are stable is important for allowing cells to function over a wide temperature range as possible. To determine this, the various anodes were placed in contact with the nitrate electrolyte and the onset of exothermic (heat-generating) events was noted by differential scanning calorimetry (DSC). The results of those tests are summarized in Table 1. Data are also included for Fe and 304 stainless steel (commonly used as a current collector in thermal cells) and Mo and graphite (sometimes used as a conductive additive in the cathode).

TABLE 1

Onset Temperatures for Exothermic Reaction of Various Anode Materials with $LiNO_3$—$KNO_3$ Eutectic.

| Anode | Onset Temperature, ° C. | Temperature of Significant Exothermic Reaction, ° C. |
|---|---|---|
| 44% Li/56% Si | 210 | >300° C. |
| 80% Al/20% Li | 284 | 315.2° C. |
| 80% Fe/20% Li (mixture) | 265 | 265° C. |
| Al | None | No reaction up to 400° C. |
| Ca | None | No reaction up to 400° C. |
| Mg | 274 | 352° C. |
| Zn | None | No reaction up to 400° C. |
| 304 stainless steel | None | No reaction up to 400° C. |
| Fe | 334 | 334 |
| Mo | 221° C. | 293° C. |
| Lonza KS-15 graphite | None | No reaction up to 400° C. |

Graphite and 304 stainless steel are compatible with the molten nitrate electrolyte, while Mo and Fe are not. Of the anodes, only Ca, Al, and Zn show no reaction up to 400° C. These materials have a lower electromotive force value (emf) than the Li alloys, however. The Li(Al) alloy showed the best stability in the molten nitrates. The others can still be used, but the upper operating temperature must be reduced to avoid an exothermic thermal event.

Cathodes that are suitable for use with molten nitrates include a number of transition-metal oxides. The results of DSC compatibility tests with various cathodes are listed in Table 2. Sulfides are not thermodynamically or kinetically stable with molten nitrates and violently react. Suitable oxide cathodes that function well with molten nitrate electrolytes include $Ag_2CrO_4$, $V_2O_5$, $LiCoO_2$, $LiNiO_2$, and similar substituted oxides (e.g., $LiNi_xCo_{1-x}O_2$), $CrO_2$ and lithiated Cr oxides, $MnO_2$, and lithiated manganese oxides, such as $LiMn_2O_4$. The preferred oxides are $MnO_2$, $LiMn_2O_4$, $Ag_2CrO_4$, and $V_2O_5$.

Soluble cathodes, instead of solid cathodes, such as a system based on $AgNO_3$ and $LiClO_4$ with Ca anodes, can also be used. The Ca anodes tend to passivate badly during discharge, requiring the addition of chloride to attack the protective film. Above 250° C., there is a tendency for the Ca to violently react with the perchlorate in the melt.

TABLE 2

Onset Temperatures for Exothermic Reaction of Various Cathode Materials with $LiNO_3$—$KNO_3$ Eutectic.

| Cathode | Onset Temperature, °C | Temperature of Significant Exothermic Reaction, °C |
|---|---|---|
| $MnO_2$ | 330 | 330° C. |
| $LiMn_2O_4$ | None | No reaction up to 400° C. |
| $Ag_2CrO_4$ | None | No reaction up to 400° C. |
| $CrO_2$ | None | No reaction up to 400° C. |
| $LiCoO_2$ | 380 | 380° C. |
| $FeS_2$ | 230 | 230° C. |

Tests have shown that the presence of chloride is detrimental to the performance of active anodes in molten nitrates. Addition of 10% LiCl to the $LiNO_3$—$KNO_3$ eutectic results in an exothermic reaction in the case of Ca when the temperature exceeds 285° C. In the case of the standard 44% Li/56% Si (w/w), the exotherm begins at 229° C. Thus, free halide ions should be excluded from the molten nitrates when used as proposed in the electrolyte system of the present invention. Similarly, Li(Si) alloy reacts exothermically with $LiClO_4$ when the temperature exceeds 304° C.

Another category of molten salt electrolytes for use in the present invention includes high-boiling organics containing dissolved Li salts. Propylene carbonate (PC), for example, has a high dielectric constant and a boiling of 242° C. Its vapor pressure at 20° C. is only 0.03 mm Hg. Ethylene carbonate (EC) has a boiling point of 177° C. under a pressure of 100 mm Hg. It melts at 36° C. and has a similar low vapor pressure as PC at room temperature. Typically, these materials are used in combination with each other, to obtain the desired physical and electrochemical properties in Li-ion cells. For such cells to function requires the addition of suitable Li salts, such as $LiPF_6$, $LiAsF_6$, $LiClO_4$, and Li triflate (Li trifluoromethanesulfonate) or imide salts (Li trifluoromethanesulfonimide). A number of these salts decompose above 100° C. Under these conditions, $LiClO_4$ can violently react with the organic electrolyte. Consequently, these are not suitable for the envisioned oil/gas borehole power supplies. Instead, the used of LiBr was examined. A 1 M LiBr solution in EC had a conductivity of about 12 mS/cm at 113° C., which is comparable to that of typical organic electrolytes at room temperature. The solubility and conductivities are higher at higher temperatures and in the presence of a cosolvent such as PC.

An electrolyte based on LiBr in PC/EC was shown compatible with the $Li(Si)/FeS_2$ couple in preliminary discharge tests at 125° C. Other anodes are equally suitable for this electrolyte, including Ca, Zn, Mg, Al, and Li(Al) alloys.

Another class of organics that has been shown to be compatible with high-activity anodes and strongly oxidizing cathodes is the sulfones. It is known that dimethyl sulfone and di-p-tolylsulfone can be used as an electrolyte for a medium-temperature reserve battery that would function at 178° C. to 270° C. Only single-cell screening tests were conducted with these systems. Data have been previously reported for a Li(Al) anode and a $Ag_2CrO_4$ cathode. Vanadium oxide in molten dimethyl sulfone and manganese oxides have also been reported as potentially useful at the temperatures present in borehole operations. Such a sulfone-based system should have applicability for use as an oil/gas borehole power supply, much as described above for the molten nitrates. Dimethyl sulfone melts at 108° C.–110° C., which is slightly lower than the melting point of the $LiNO_3$—$KNO_3$ eutectic and slightly higher than the $CsNO_3$—$LiNO_3$—$KNO_3$ eutectic.

Tests were carried out with candidate anodes and cathodes and the results are shown in Table 3 and 4, respectively, for dimethyl sulfone.

TABLE 3

Onset Temperatures for Reaction of Various Anode Materials with Dimethyl Sulfone.

| Anode | Onset Temperature, °C | Remarks |
|---|---|---|
| 44% Li/56% Si | 201 | Medium exotherm |
| 80% Al/20% Li | 235 | Rapid exo at 385° C. |
| Al | None | No reaction up to 400° C. |
| Ca | None | No reaction up to 400° C. |
| Mg | None | No reaction up to 400° C. |
| Zn | None | No reaction up to 400° C. |

TABLE 4

Onset Temperatures for Reaction of Various Cathode Materials with Dimethyl Sulfone.

| Cathode | Onset Temperature, °C | Remarks |
|---|---|---|
| $Ag_2CrO_4$ | 300 | Weak exotherm |
| $CrO_2$ | 299 | Endotherm |
| $LiCoO_2$ | None | No reaction up to 400° C. |

The compatibility of several possible Li salts that could be used to increase the ionic conductivity of the melts was also examined. $LiNO_3$ reacts exothermically with dimethyl sulfone at 297° C. $LiClO_4$ similarly reacts at temperatures above 288° C. These reactions would not be as important as that involving the anodes, as those take place at much lower temperatures. In contrast, LiBr shows no reaction up to 400° C.

Another category of useful molten salts in the present invention involves materials that are supercooled liquids at room temperature, so-called "room-temperature molten salts." These have been a laboratory curiosity for years but interest in their use for other than electrochemical purposes has increased in recent years. They have been shown to have catalytic properties for various organic reactions.

One class of these materials that has been extensively studied is based on imidazolium salts, particularly those with the tetrachloroaluminate derivative, $AlCl_4^-$, such as salts based on 1-ethyl-3-methlyimidazolium (EMI) tetrachloroaluminate. From a practical perspective, the tetrachloroaluminates have several undesirable properties. For one, they are very moisture sensitive. More importantly, they are not stable in contact with high-activity alloys [e.g., Li(Al) or Li(Si)].

However, EMI room-temperature molten salts based on the tetrafluoroborate anion, $BH_4^-$ ($EMIBH_4$) was shown to be stable with the $Li/LiMn_2O_4$ couple from room temperature to upwards of 300° C. In addition, they are not moisture or air sensitive. A similar salt of EMI with triflate and mesylate anions has also been synthesized and has similar properties as the tetrafluoroborate derivative. The triflate salt is stable to 350° C. These room-temperature molten salts are ideal candidates for use in oil/gas borehole power sources, since they can be used at room temperature as well as the elevated temperatures in the boreholes.

EXAMPLES

Example 1

$Li(Si)/LiNO_3$—$KNO_3/CrO_2$

The performance of a $Li(Si)/LiNO_3$—$KNO_3/CrO_2$ cell at 200° C. and a current density of 15 $mA/cm^2$. The cell was 1.25" in diameter, with a 1-g anode and 1-g cathode. The anode was 44% Li/56% Si and contained 20% electrolyte and the cathode contained 20% electrolyte as well as 10% KS-6 graphite, as a conductive additive. (Analyses with differential scanning calorimetry showed that the graphite is stable with the molten nitrates under these conditions. This is critical for proper functioning of the cell.) The electrolyte composition was 33.06% $LiNO_3$/66.94% $KNO_3$. As shown in FIG. 1, the cell discharged for 5,000 s to a cutoff voltage of 1.0 V and the resistance did not increase dramatically until over 3,000 s.

Example 2

Li(Al)/$LiNO_3$—$KNO_3$/$CrO_2$

Figure 2:
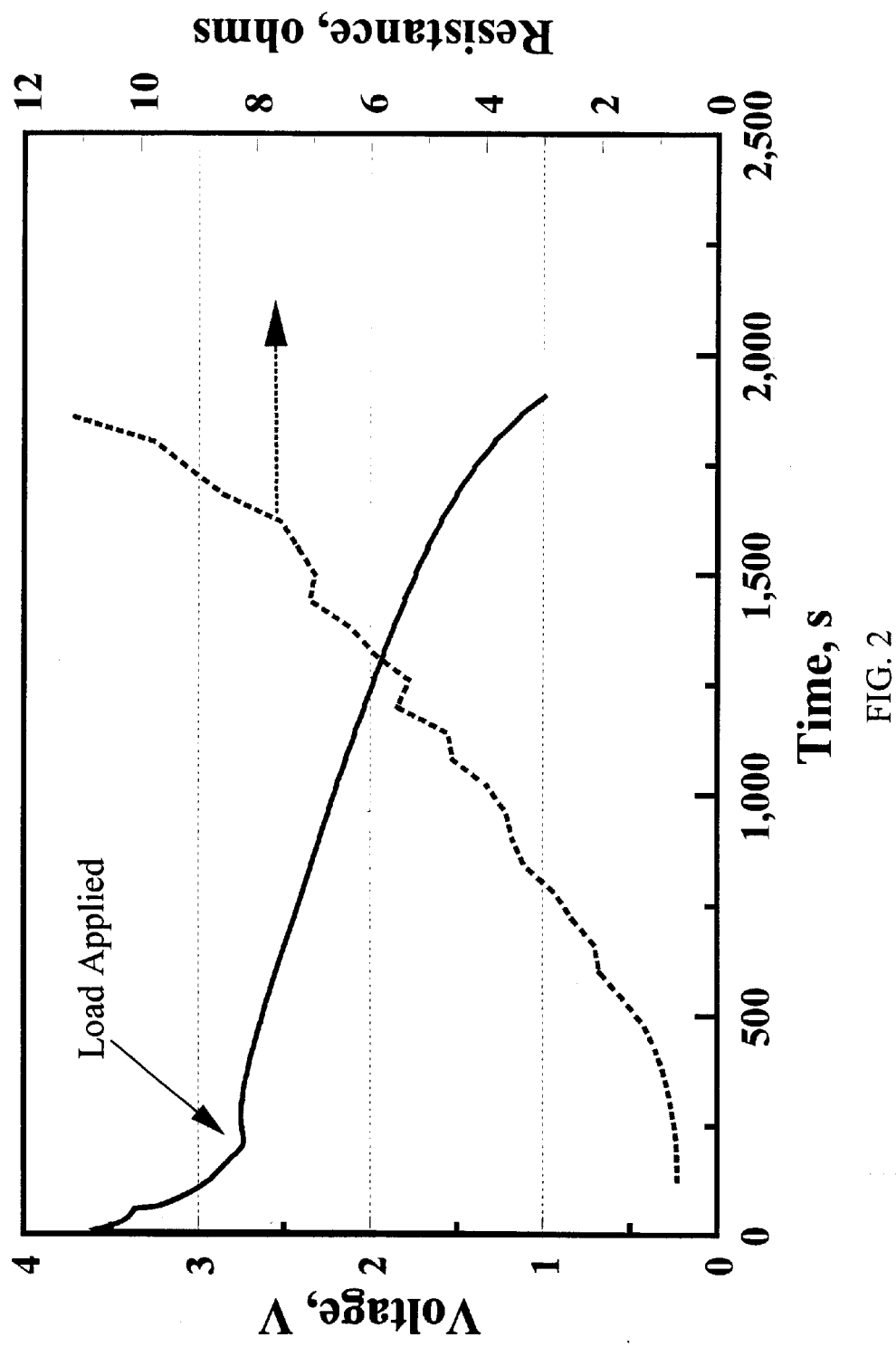
FIG. 2 shows cell electrochemical characteristics for the 20% Li/80% Si/LiNO$_3$—KNO$_3$/CrO$_2$ system.

The experiment of Example 1 was repeated with an anode of 20% Li/80% Al and 20% electrolyte. The use of a Li(Al) anode (FIG. 2) resulted in a lower cell voltage and less than half the discharge life of the cell with Li(Si) (FIG. 1).

Example 3

Li(Al)/$LiNO_3$—$KNO_3$/ of $Ag_2CrO_4$

Figure 3:
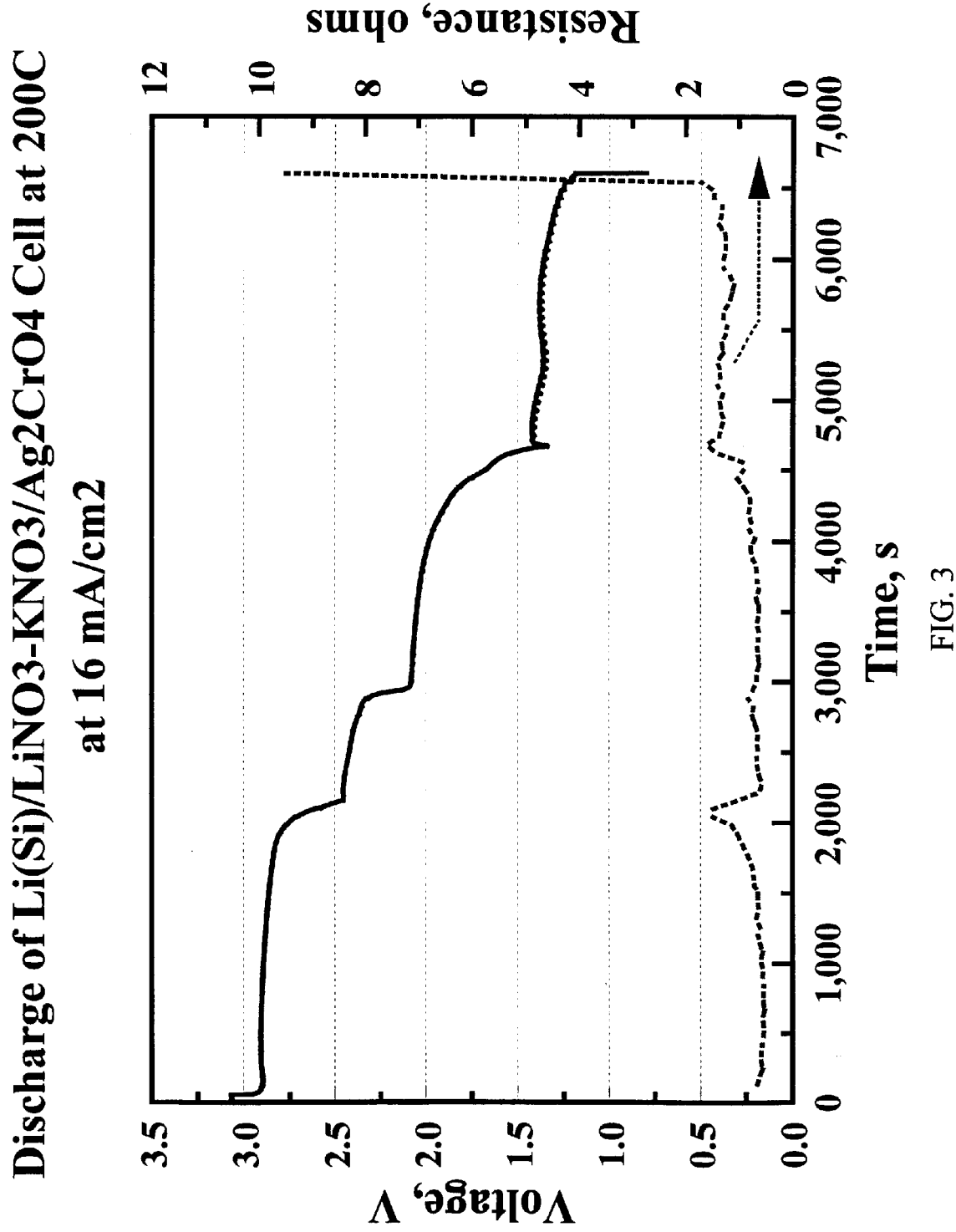
FIG. 3 shows cell electrochemical characteristics for the 44% Li/56% Si/LiNO$_3$—KNO$_3$/Ag$_2$CrO$_4$ system.

The experiment of Example 1 was repeated with a cathode of $Ag_2CrO_4$ with the same electrolyte and graphite concentrations. The use of the $Ag_2CrO_4$ cathode resulted in a number of voltage transitions associated with both anode and cathode transitions. The cell ran over 6,600 s and showed a relatively low cell impedance which did not change much with discharge time, as was observed with the $CrO_2$ cells under the same conditions (FIG. 3).

Example 4

Li-alloy/$LiNO_3$—KNO3/ of $Ag_2CrO_4$

Figure 4:
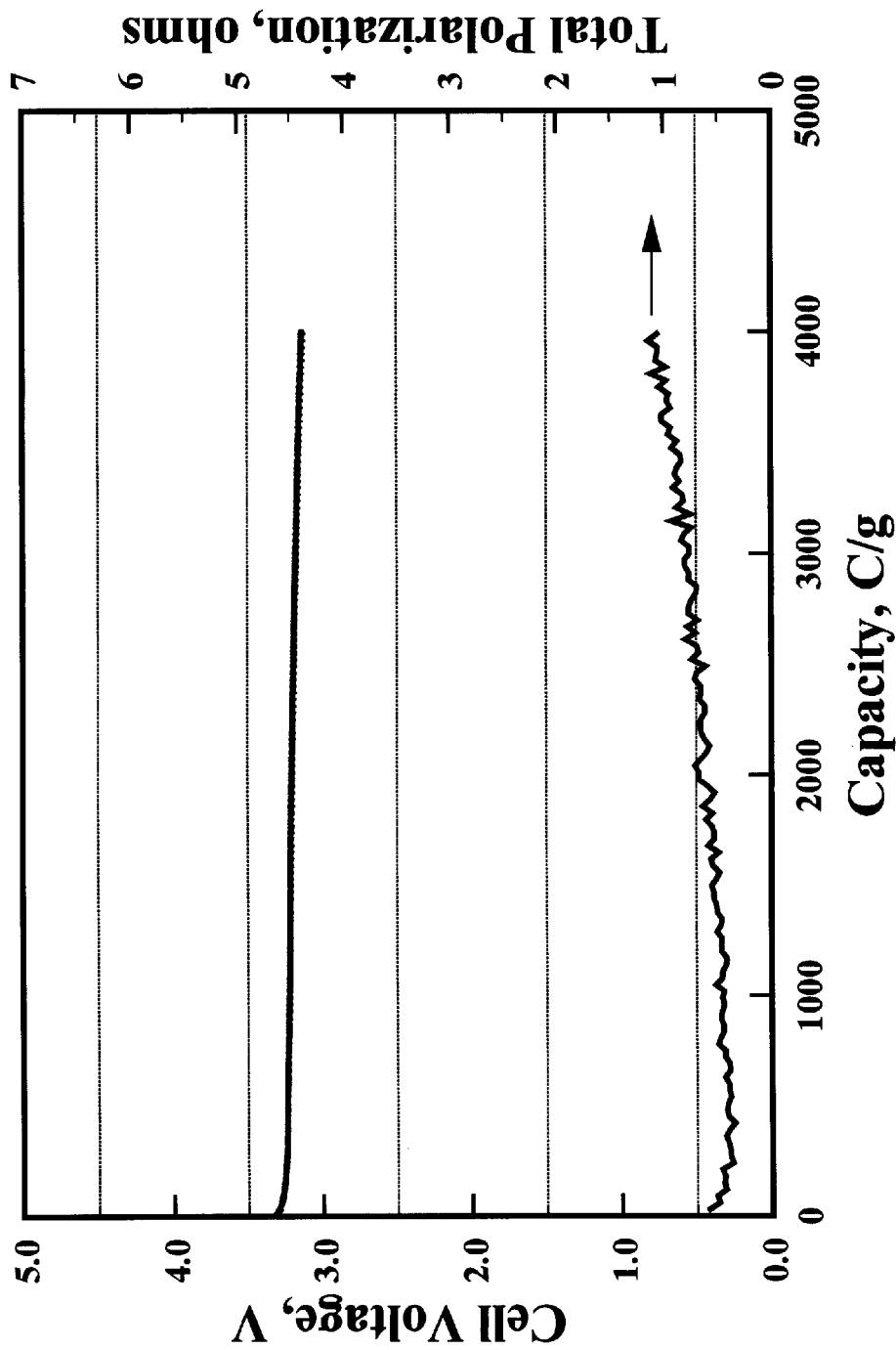
FIG. 4 shows cell electrochemical characteristics for the immobilized Li/LiNO$_3$—KNO$_3$/Ag$_2$CrO$_4$ system.

The experiment of Example 3 was repeated with an anode of immobilized Li. The node contained 80% Fe and 20% Li and no electrolyte; its weight was only 60 mg. The performance of this cell is shown in FIG. 4 for a temperature of 200° C. and a current density of 7.6 $mA/cm^2$. For comparison purposes, the corresponding performance of cells with Li(Si) and Li(Al) anodes is also presented. The best overall results were obtained with the cell with the liquid Li anode (LAN). It had the highest cell potential and the lowest polarization, which was consistent throughout discharge, in contrast to the increases associated with Li(Si) and Li(Al) at anode phase transitions.

The invention being thus described, it will be apparent to those skilled in the art that the same may be varied in many ways. Such variations are not to be regarded as a departure from the spirit and scope of the invention, and all such modifications are intended to be included within the scope of the following claims.

I claim:

1. An electrolyte system suitable for a molten salt electrolyte battery, the electrolyte system comprising a material with a melting temperature between approximately room temperature and approximately 250° C., said material selected from at least one molten nitrate compound having a melting point temperature of less than approximately 250° C., said molten nitrate compound consisting essentially of a mixture of lithium nitrate, potassium nitrate, and cesium nitrate, at least one organic compound containing dissolved lithium salts, and at least one 1-ethyl-3-methylimidazolium salt.

2. The electrolyte system of claim 1 wherein the molten nitrate compound is combined with a nitrate compound.

3. The electrolyte system of claim 1 wherein the organic compound containing dissolved lithium salts is an organic compound selected from propylene carbonate, ethylene carbonate, dimethyl sulfone and di-p-tolylsulfone containing at least one dissolved lithium salt selected from $LiPF_6$, $LiAsF_6$, $LiClO_4$, Li triflate salts and Li imide salts.

4. The electrolyte system of claim 1 wherein the 1-ethyl-3-methylimidazolium salt is selected from 1-ethyl-3-methylimidazolium tetrafluoroborate, 1-ethyl-3-methylimidazolium triflate and 1-ethyl-3-methylimidazolium mesylate.

5. A battery for operation with a molten salt electrolyte comprising an anode, a cathode and an electrolyte system in accordance with claim 1.

6. The battery of claim 5 wherein said anode is made from a material selected from an lithium-aluminum alloy, an lithium-silicon alloy, a calcium alloy, a magnesium alloy, a zinc alloy, a lithium-boron alloys, and a molten lithium immobilized with a metal selected from nickel, copper and stainless steel Feltmetal.

7. The battery of claim 5 wherein the lithium-aluminum alloy has between approximately 20 w/w % from 25 w/w % lithium.

8. The battery of claim 5 wherein the lithium-silicon alloy has between approximately 40 w/w % to approximately 55 w/w % lithium.

9. The battery of claim 5 wherein the cathode is made from a material selected from $Ag_2CrO_4$, $V_2O_5$, $LiCoO_2$, $LiNiO_2$, $LiNi_xCo_{1-x}O_2$, $CrO_2$, lithiated Cr oxides, $MnO_2$, and lithiated manganese oxides.

* * * * *